United States Patent
Wood

(10) Patent No.: US 12,453,593 B2
(45) Date of Patent: Oct. 28, 2025

(54) MEDICAL DEVICE SYSTEM WITH REUSABLE DEVICE POWER CORD

(71) Applicant: GYRUS ACMI, INC., Southborough, MA (US)

(72) Inventor: Charles E. Wood, Eden Prairie, MN (US)

(73) Assignee: Gyrus ACMI, Inc., Westborough, MA (US)

(*) Notice: Subject to any disclaimer, the term of this patent is extended or adjusted under 35 U.S.C. 154(b) by 491 days.

(21) Appl. No.: 17/074,815

(22) Filed: Oct. 20, 2020

(65) Prior Publication Data

US 2021/0128223 A1    May 6, 2021

Related U.S. Application Data

(60) Provisional application No. 62/928,403, filed on Oct. 31, 2019.

(51) Int. Cl.
| A61B 18/12 | (2006.01) |
| A61B 17/00 | (2006.01) |
| A61B 17/32 | (2006.01) |
| A61B 90/90 | (2016.01) |
| A61B 18/14 | (2006.01) |

(52) U.S. Cl.
CPC .. *A61B 18/1206* (2013.01); *A61B 17/320068* (2013.01); *A61B 90/90* (2016.02); *A61B 2017/00115* (2013.01); *A61B 2017/320093* (2017.08); *A61B 18/1445* (2013.01); *A61B 2018/1455* (2013.01)

(58) Field of Classification Search
CPC ........ A61B 18/1206; A61B 17/320068; A61B 90/90
See application file for complete search history.

(56) References Cited

U.S. PATENT DOCUMENTS

| 5,400,267 | A | * | 3/1995 | Denen | ...................... H02J 3/00 |
| | | | | | 323/911 |
| 6,387,092 | B1 | | 5/2002 | Burnside et al. | |
| 6,638,212 | B1 | | 10/2003 | Oshima | |

(Continued)

FOREIGN PATENT DOCUMENTS

| JP | H06251621 A | 9/1994 |
| JP | 2003024269 A | 1/2003 |

(Continued)

OTHER PUBLICATIONS

"International Application Serial No. PCT/US2020/056467, International Search Report mailed Apr. 22, 2021", 3 pgs.

(Continued)

*Primary Examiner* — Joseph A Stoklosa
*Assistant Examiner* — Annie L Shoulders
(74) *Attorney, Agent, or Firm* — Schwegman Lundberg & Woessner, P.A.

(57) ABSTRACT

A reusable cable connecting a surgical device to a therapy generator can include a memory device to track the surgical devices that have been used with the cable. When the cable is coupled to the therapy generator, a control circuit in the therapy generator can interrogate the cable and read data stored in the memory device of the cable, where the data represents a number of surgical devices previously coupled to the cable.

24 Claims, 4 Drawing Sheets

(56) References Cited

U.S. PATENT DOCUMENTS

| | | |
|---|---|---|
| 6,651,669 B1 | 11/2003 | Burnside |
| 6,908,472 B2 | 6/2005 | Wiener et al. |
| 7,383,073 B1 | 6/2008 | Abovitz et al. |
| 8,002,769 B2 | 8/2011 | Goble et al. |
| 9,262,252 B2 | 2/2016 | Kirkpatrick et al. |
| 9,622,749 B2 | 4/2017 | Vaitekunas et al. |
| 9,699,859 B1* | 7/2017 | Li .................... H05B 45/20 |
| 9,706,674 B2 | 7/2017 | Collins et al. |
| 9,833,235 B2 | 12/2017 | Penna et al. |
| 10,172,684 B2* | 1/2019 | Conlon ............... A61B 17/295 |
| 2006/0025814 A1 | 2/2006 | Hatori |
| 2008/0054073 A1* | 3/2008 | Charles .............. G06Q 10/087 |
| | | 235/385 |
| 2009/0065565 A1 | 3/2009 | Cao |
| 2011/0125138 A1* | 5/2011 | Malinouskas .......... A61B 90/90 |
| | | 606/1 |
| 2011/0209915 A1* | 9/2011 | Telfort ................ A61B 5/7203 |
| | | 174/71 R |
| 2011/0270179 A1 | 11/2011 | Ouyang et al. |
| 2012/0130160 A1 | 5/2012 | Borrye et al. |
| 2012/0191091 A1 | 7/2012 | Allen |
| 2014/0364883 A1 | 12/2014 | Schoenle et al. |
| 2015/0032029 A1 | 1/2015 | Al-ali et al. |
| 2016/0000301 A1 | 1/2016 | Langell et al. |
| 2017/0189102 A1 | 7/2017 | Hibner et al. |
| 2017/0215699 A1 | 8/2017 | Ouyang et al. |
| 2018/0014872 A1* | 1/2018 | Dickerson .......... A61B 18/1206 |
| 2018/0344133 A1 | 12/2018 | Couvillon, Jr. |
| 2019/0082929 A1* | 3/2019 | Watanabe ................ A61B 1/05 |
| 2020/0100655 A1 | 4/2020 | Morishima et al. |
| 2022/0015828 A1* | 1/2022 | Brannan ............ A61B 18/1815 |

FOREIGN PATENT DOCUMENTS

| | | |
|---|---|---|
| JP | 4015403 B2 | 11/2007 |
| JP | 2009148420 A | 7/2009 |
| JP | 4961262 B2 | 6/2012 |
| JP | 5325401 B2 | 10/2013 |
| WO | WO-9414129 A1 | 6/1994 |
| WO | WO-2021086681 A1 | 5/2021 |

OTHER PUBLICATIONS

"International Application Serial No. PCT/US2020/056467, Written Opinion mailed Apr. 22, 2021", 7 pgs.

"International Application Serial No. PCT/US2020/056467, International Preliminary Report on Patentability mailed May 12, 2022", 9 pgs.

* cited by examiner

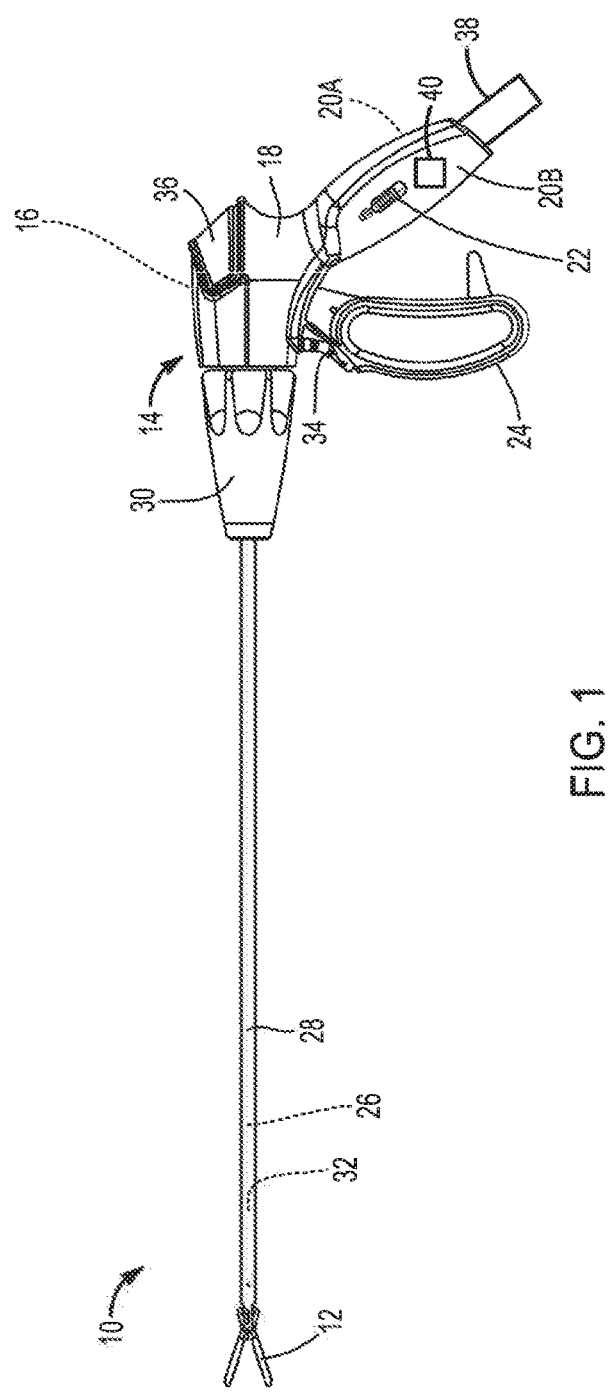
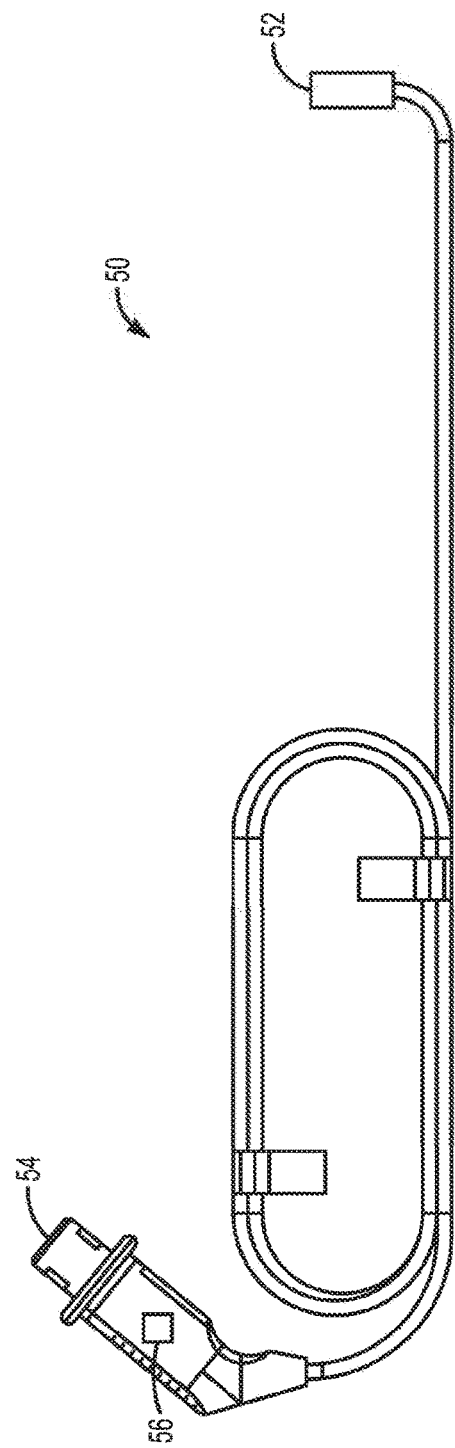
FIG. 1
FIG. 2

MEDICAL DEVICE SYSTEM WITH REUSABLE DEVICE POWER CORD

CROSS-REFERENCE TO RELATED APPLICATION

This application claims the benefit of priority to U.S. Provisional Patent Application Ser. No. 62/928,403, filed on Oct. 31, 2019; the contents of which are incorporated herein in their entirety.

FIELD OF THE DISCLOSURE

This disclosure relates generally to medical device systems.

BACKGROUND

Disposable RF surgical devices can utilize re-usable power cords. Typically, re-usable cords have a limited number of re-uses due to the fact they have to be sterilized after each medical procedure. Sterilization is often done using an autoclave, which limits the number of times the cable can be re-sterilized. It can be challenging for hospitals to track the limited number of re-uses of the re-usable power cords.

SUMMARY OF THE DISCLOSURE

Using various techniques of this disclosure, a reusable cable, e.g., power cord, connecting a surgical device to a therapy generator can include a memory device to track the surgical devices that have been used with the cable. When the cable is coupled to the therapy generator, a control circuit in the therapy generator can interrogate the cable and read data stored in the memory device of the cable, where the data represents a number of surgical devices previously coupled to the cable.

In some aspects, this disclosure is directed to a surgical system comprising: a control circuit; and an output circuit coupled to the control circuit and configured to generate and provide a therapeutic output signal to an output terminal for delivery to a patient, wherein the control circuit is configured to: read data stored in a memory device of a first device when the first device is coupled to a terminal in electrical communication with the control circuit, wherein the data represents a number of second devices previously coupled to the first device; and determine, based on the data read from the memory device, whether the number of second devices previously coupled to the first device meets a criterion.

In some aspects, this disclosure is directed to a method of operating a surgical system, the method comprising: read data stored in a memory device of a first device when the first device is coupled to a therapy generator of the surgical system, wherein the data represents a number of second devices previously coupled to the first device; and determining, based on the data read from the memory device, whether the number of second devices previously coupled to the first device meets a criterion.

In some aspects, this disclosure is directed to a surgical system comprising: a first device including a first memory device, the first memory device configured to store a unique first identifier of the first device; and a second device including: a connector configured to couple to the first device; and a second memory device configured to: store data that represents a number of first devices previously coupled to the second device.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 1 is a side view of an example of a surgical device that can be used to implement various techniques in this disclosure.

FIG. 2 is a side view of an example of a cable that can be coupled to the device of FIG. 1.

DETAILED DESCRIPTION

Figure 3:
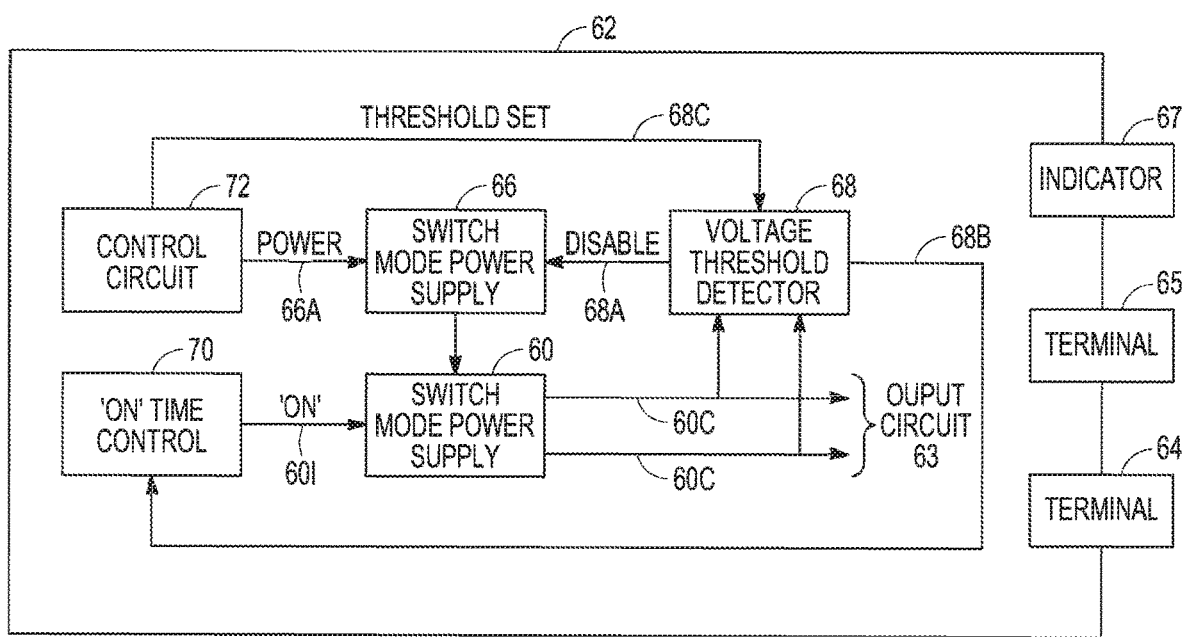
FIG. 3 is a block diagram of a non-limiting example of a therapy generator that can be used with various techniques of this disclosure.

Using various techniques of this disclosure, a reusable cable, e.g., power cord, connecting a surgical device to a therapy generator can include a memory device to track the surgical devices that have been used with the cable. When the cable is coupled to the therapy generator, a control circuit in the therapy generator can interrogate the cable and read data stored in the memory device of the cable, where the data represents a number of surgical devices previously coupled to the cable.

FIG. 1 is a side view of an example of a surgical device that can be used to implement various techniques in this disclosure. In particular, FIG. 1 depicts forceps showing jaws in an open position. Forceps 10 includes jaws 12, housing 14 (including first housing portion 16, second housing portion 18, and fixed handle 20A and 20B), handle locking mechanism 22, movable handle 24, inner shaft 26, outer shaft 28, rotation knob 30, blade 32, cut trigger 34, and activation button 36.

Forceps 10 can be a medical, e.g., surgical, device or instrument, such as medical forceps, cutting forceps, electrosurgical forceps, or any other type of forceps. Forceps 10 has jaws 12 at a distal end and housing 14 at a proximal end. Jaws 12 are capable of opening and closing. Housing 14 has first housing portion 16 on a first side and second housing portion 18 on a second side. First housing portion 16 has first fixed handle portion 20A extending from a bottom of first housing portion 16, and second housing portion 18 has second fixed handle portion 20B extending from a bottom of second housing portion 18. First housing portion 16 and second housing portion 18 are connected, and first fixed handle portion 20A and second fixed handle portion 20B make up fixed handle 20A and 20B. Thus, fixed handle 20A and 20B is at a bottom of housing 14. Handle locking mechanism 22 is within fixed handle 20A and 20B and connects to movable handle 24. Movable handle 24 is connected to housing 14 and is adjacent fixed handle 20A and 20B. Movable handle 24 is indirectly connected to a proximal end of inner shaft 26 within housing 14.

Inner shaft 26 extends through housing 14 and out of a distal end of housing 14, or distally beyond housing 14. Jaws 12 are connected to a distal end of inner shaft 26. Outer shaft 28 is a hollow tube positioned around inner shaft 26. A distal end of outer shaft 28 is adjacent jaws 12. Distal ends of inner shaft 26 and outer shaft 28 are rotationally locked to jaws 12. Rotation knob 30 is positioned around a distal end of housing 14 and indirectly connected to a proximal end of outer shaft 28. Outer shaft 28 extends out of rotation knob 30. Blade 32 extends through inner shaft 26 and outer shaft 28. A distal end of blade 32 is adjacent jaws 12. A proximal end of blade 32 is within housing 14. A proximal end of cut trigger 34 is connected to blade 32 within housing 14. A distal end of cut trigger 34 extends outside housing 14 adjacent movable handle 24. Activation button 36 fits within housing 14. Activation button 36 connects to electronic circuitry (not shown) within housing 14 that sends electrical energy through forceps 10 to jaws 12.

As seen in FIG. 1, jaws 12 are in an open position when movable handle 24 is in a distal position. Closing movable handle 24, or pulling movable handle 24 proximally toward fixed handle 20A and 20B, closes jaws 12 (not depicted). Movable handle 24 may be closed due to user input. Handle locking mechanism 22 can be engaged to lock movable handle 24 in position, thereby locking jaws 12 in position. Rotating rotation knob 30 causes outer shaft 28 and inner shaft 26 to rotate, thereby rotating jaws 12. Compressing a distal end of cut trigger 34 moves a proximal end of cut trigger 34 in a distal direction with respect to housing 14, causing blade 32 to move longitudinally in a distal direction. As a result, blade 32 protrudes from a distal end of inner shaft 26. Activation button 36 can be actuated to send electrical energy to jaws 12.

A distal portion of forceps 10, including jaws 12, can be inserted into a body of a patient, such as through an incision, while a proximal portion of forceps 10, including housing 14, remains external to the patient. Movable handle 24 can be closed to close jaws 12 around tissue or another anatomical feature within the body. Activation button 36 can be actuated to provide electrical energy to jaws 12 to cauterize or seal the tissue within closed jaws 12. Cut trigger 34 can be moved to translate blade 32 distally in order to cut the tissue within jaws 12. Rotation knob can be rotated via user input to rotate jaws 12 for proper maneuvering or positioning of jaws 12 during the surgical process.

The surgical device 10 of FIG. 1 can further include a connector 38 coupled to the handle 20A, 20B. The connector 38 can be coupled to a corresponding connector of a second device, e.g., a connector 52 of a re-usable, disposable cable 50 of FIG. 2. In some examples, the surgical device 10 is a single-use device.

In addition, the surgical device 10 can include a memory device 40, such as an electrically erasable programmable read-only memory (EEPROM), FLASH memory, erasable programmable read-only memory (EPROM), and the like. In some example implementations, the memory device 40 can store data representing a unique identifier of the surgical device 10, e.g., a serial number of the surgical device 10. In some examples, the memory device 10 can store data representing information that a therapy generator, e.g., electrosurgical generator, ultrasonic generator, and the like, can use during a medical procedure, such as one or more waveforms (e.g., RF waveforms), parameters, and other electrical settings that are compatible for use with the surgical device 10.

As described in more detail below, the memory device 40 can communicate with a therapy generator and a memory device in a cable configured to couple to the therapy generator, e.g., memory device 56 of the cable 50 of FIG. 2. The cable coupling the surgical device to the therapy generator can include a memory device to track the surgical devices that have been used with the cable. When the cable is coupled to the therapy generator, a control circuit in the therapy generator can interrogate the cable and read data stored in the memory device of the cable, where the data represents a number of surgical devices 10 previously coupled to the cable 50. It should be understood that a "previously coupled" surgical device can include the surgical device 10 that is currently coupled to the cable because the cable currently coupled was coupled prior to the data reading. A "previously coupled" surgical device does not have to be uncoupled from the cable.

Then, a control circuit in the therapy generator can determine, based on the data read from the memory device, whether the number of second devices previously coupled to the first device meets a criterion, e.g., a threshold number of uses. In this manner, the control circuit can determine if the re-usable cable, for example, has met or exceeded a number of uses.

In some example implementations, the control circuit in the therapy generator can determine whether the unique identifier of the surgical device 10 is included in the data that represents the number of surgical devices previously coupled to the cable. In this manner, the control circuit can determine if the unique identifier of the one-time use surgical device 10 is included in the data, indicating that the surgical device should not be used again.

It should be noted that although forceps are depicted in FIG. 1, the techniques of this disclosure are applicable to any surgical device and not limited to forceps.

FIG. 2 is a side view of an example of a cable that can be coupled to the device of FIG. 1. The cable 50, e.g., a device power cord configured to provide power to a surgical device, can include a first end having a connector 52 configured to couple to a connector of a surgical device, e.g., connector 38 of the surgical device 10 of FIG. 1. The connector 52 can allow the surgical device 10 to be detached from the cable 50 without damage to the cable, thereby permitting reuse of the cable 50.

The cable can include a second end having a connector 54 configured to couple to a terminal of a therapy generator, e.g., terminal 65 of the therapy generator 62 of FIG. 3, that is in electrical communication with the control circuit of the therapy generator. It should be noted that the connector 54 of the cable need not be directly coupled to the terminal of the therapy generator. Rather, the connector 54 of the cable 50 can be indirectly coupled, e.g., via an intervening device, cable, and/or adapter.

The connector 54 can include a memory device 56, such as an EEPROM, FLASH memory, EPROM, and the like. As mentioned above, in some examples, the memory device 56 can store data that represents a number of surgical devices previously coupled to the cable, which can include the currently coupled surgical device. By storing this data, the control circuit can determine whether the cable has met or exceeded its number of reuses, e.g., 2-50 reuses or more.

In some examples, the control circuit can communicate with the memory device 56 using a single protocol: such as SPI, I2C, 1-Wire and the like. Although it can be desirable to use a single protocol (e.g., network or bus), the controller can use SPI to communicate with the device memory 40, and a different bus, such as I2C to communicate with the cable memory 56.

In addition, in some example implementations, the memory device can store data representing an identifier, e.g., unique, that represents a plurality of surgical devices, e.g., a stock keeping unit (SKU). The control circuit of the therapy generator can retrieve the identifier, e.g., data representing the SKU or other product information, for example, and determine whether the identifier is compatible for use with the therapy generator of the surgical system. In this manner, the identifier can act as an electronic "key" and can allow multiple, standard "family" cables to be used with the therapy generator without the need for a mechanical key, e.g., a unique connector 54, to ensure the proper cable is used.

As a non-limiting example, assume that it is desirable to have three different re-usable cables 50 for three different classes, e.g., families, of surgical devices 10. Mechanical keys require special tooling in order to manufacture the keyed connectors. By using an electronic key, the same mechanical connector can be used on all of the cables, instead of using multiple, different mechanical connectors that each require their own unique tooling. The memory device 56 in each connector 54 of the cable can be programmed with an identifier that indicates with which class or family of surgical devices it is associated. As an example, if the wrong cable was coupled to the therapy generator for a particular device class, e.g., family, the control circuit can determine that the cable is incorrect and provide an indication to the user, e.g., audible and/or visual indicator.

FIG. 3 is a block diagram of a non-limiting example of a therapy generator that can be used with various techniques of this disclosure. The non-limiting example shown in FIG. 3 is an electrosurgical generator, as described in commonly assigned U.S. Pat. No. 8,002,769 to Colin Goble et al., the entire contents of which being incorporated herein by reference.

The therapy generator 62 of FIG. 3 can include an output circuit 63 having a radio frequency (RF) power oscillator 60 and having a pair of output lines 60C for coupling to a surgical device via a cable, e.g., surgical device 10 of FIG. 1 via cable 50 of FIG. 2. Power can be supplied to the oscillator 60 by a switched mode power supply 66. In an example implementation, the RF oscillator 60 can operate at about 400 kHz, with any frequency from 300 kHz upwards into the HF range.

The switched mode power supply typically can operate at a frequency in the range of from 25 to 50 kHz. Coupled across the output lines 60C is a voltage threshold detector 68 having a first output 68A coupled to the switched mode power supply 16 and a second output 68B coupled to an "on" time control circuit 70. A control circuit 72 can be connected to a control input 66A of the power supply 66 for adjusting the generator output power by supply voltage variation and to a threshold-set input 68C of the voltage threshold detector 68 for setting peak RF output voltage limits.

As seen in FIG. 3, the output circuit 63 can be coupled to the control circuit 72 and can generate and provide a therapeutic output signal to an output terminal 64 for delivery to a patient. The connector 54 of the cable 50 of FIG. 2 and can be coupled, indirectly or directly, to a terminal 65, which is in electrical communication with the control circuit 72. In some examples, the terminal 65 and the output terminal 64 can be the same terminal.

In some example implementations, the therapy generator 62 of FIG. 3 can include an indicator 67, e.g., a display and/or audio output. The indicator 67 can provide an indication to a user. In some examples, a surgical system can include a therapy generator, a surgical device, and a cable, such as the therapy generator 62 of FIG. 3, the surgical device 10 of FIG. 1, and the cable 50 of FIG. 2.

Although FIG. 3 depicts an electrosurgical generator, the techniques of this disclosure are applicable to other therapy generators, including ultrasonic generators. A non-limiting example of an ultrasonic generator that can implement various techniques of this disclosure is shown and described in commonly assigned U.S. Pat. No. 9,622,749 to Vaitekunas et al., the entire contents of which being incorporated herein by reference.

Figure 4:
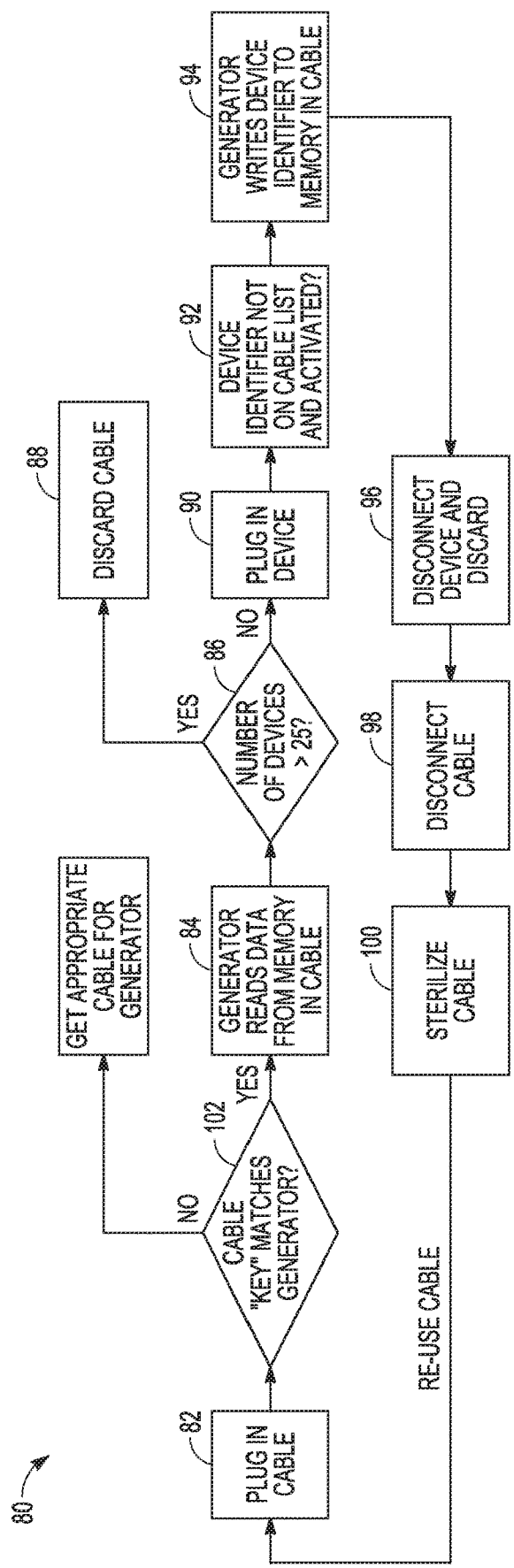
FIG. 4 is an example of method of operating a surgical system using various techniques of this disclosure.

FIG. 4 is an example of method 80 of operating a surgical system using various techniques of this disclosure. At block 82, a user can plug a cable into a therapy generator. For example, a user can couple a connector 54 of the cable 50 of FIG. 2, indirectly or directly, to the terminal 65 of the therapy generator 62 of FIG. 3.

At block 84, a control circuit can read data stored in a memory device of the cable when the cable is coupled to the therapy generator of the surgical system, where the data represents a number of surgical devices previously coupled to the cable. For example, the control circuit 72 of FIG. 3 can read data stored in the memory device 56 of the cable 50 of FIG. 2 when the cable is coupled to the therapy generator. The data can represent a number of surgical devices, e.g., surgical device of FIG. 1, previously coupled to the cable, e.g., a list of serial numbers and/or a count of serial numbers. It should be noted that the number of previously coupled devices can include the currently coupled device. In some examples, the data can be stored as data representing a list of serial numbers. Alternatively, or additionally, the data can be stored as data representing a count of serial numbers. In addition, the memory device 56 of cable 50 can store the criterion (e.g., threshold) or alternately, the control circuit can store the criterion. The former can be advantageous in that different cable "families" can store their own criterion, thereby not requiring the customer to update the control circuit firmware with new criterion when a new cable family is created.

At block 86, the control circuit can determine, based on the data read from the memory device, whether the number of surgical devices previously coupled to the cable meets a criterion. For example, the control circuit 72 of FIG. 3 can compare the data to a threshold number of devices. If the number does meet the criterion ("YES" branch of block 86) then the user can discard the cable (block 88). In some examples, the control circuit can generate an indication to a user, e.g., via indicator 67 of FIG. 3, when the number of surgical devices previously coupled to the cable does not meet the criterion, e.g., meets or exceeds a threshold. If the number does meet the criterion ("NO" branch of block 86), then the user can couple a surgical device to the cable (block 90). Similarly, in some examples, the control circuit can indicate to the user how many remaining uses remain for the re-usable cable.

At block 90, the control circuit can optionally determine whether a unique identifier of the surgical device is included in the data that represents a number of surgical devices previously coupled to the cable. For example, the data stored in the memory device of the cable can include unique identifiers of all of the surgical devices previously coupled to the cable. If the unique identifier of the surgical device coupled to the cable is already included in the data, then the surgical device has already been used and should be discarded (if it is a single-use surgical device).

At block 92, the control circuit can determine if the unique identifier of the surgical device coupled to the cable is already in the data read from the memory device. If the unique identifier of the surgical device coupled to the cable is already in the data, then, at block 94, the control circuit can control the therapy generator to write the unique identifier of the surgical device to the memory device of the cable. For example, the control circuit can write the serial number to the memory device, increase a count stored in the memory device, or both.

Next, a surgery can be performed. At block 96, the surgical device can be disconnected from the cable and discarded. At block 98, the cable can be disconnected from the therapy generator and, at block 100, sterilized, e.g., using an autoclave, and reused.

At block 102, optionally, the control circuit can read data representing an identifier, e.g., an electronic key, from the memory device in the cable and determine if it is compatible with the therapy generator. For example, the control circuit 72 of the therapy generator 62 of FIG. 3 can read data stored in the memory device 56 representing an identifier, where the identifier represents a plurality of surgical devices, e.g., an electronic key representing a family of devices. The control circuit can compare the data representing the identifier, e.g., electronic key, with data representing the therapy generator and determine whether the identifier is compatible for use with the surgical system. In some examples, the control circuit can generate an indication to a user, e.g., via indicator 67 of FIG. 3, when the identifier is determined to not be compatible with the surgical system.

In some example implementations, the memory device of the surgical device, e.g., the memory device 40 of FIG. 1, can store data representing an identifier that represents a plurality of cables or generators, e.g., a family of cables and/or generators. The identifier can act as an electronic key. The control circuit can read the electronic key from the memory device in the surgical device and determine if it is compatible with the cable and/or therapy generator.

Although various techniques of this disclosure were described above with respect to the control circuit of the therapy generator, among other things, querying a memory device in the cable for data representing a number of surgical devices previously coupled to the cable, e.g., serial numbers associated with the surgical devices, the techniques of this disclosure are not so limited. Rather, in some example implementations, the cable can transmit data representing its identifier to the surgical device. The surgical device can store the cable's identifier, along with identifiers of previously coupled cables, and the therapy generator can read the data from the surgical device.

It should be noted that the method 80 shown in FIG. 4 is a non-limiting example. The flow of the method is not limited to that shown. For example, the control circuit can read the electronic key at block 102 after it reads the number of counts at block 86.

Further, the techniques were described above with respect to two devices, a cable and a surgical device. However, the techniques are applicable to devices other than a cable and a surgical device, and are applicable to systems with more than two devices coupled serially or in parallel, e.g., multiple disposable devices. For instance, the techniques described in this disclosure can be used with a system having more than two devices coupled via a manifold, for example.

Figure 5:
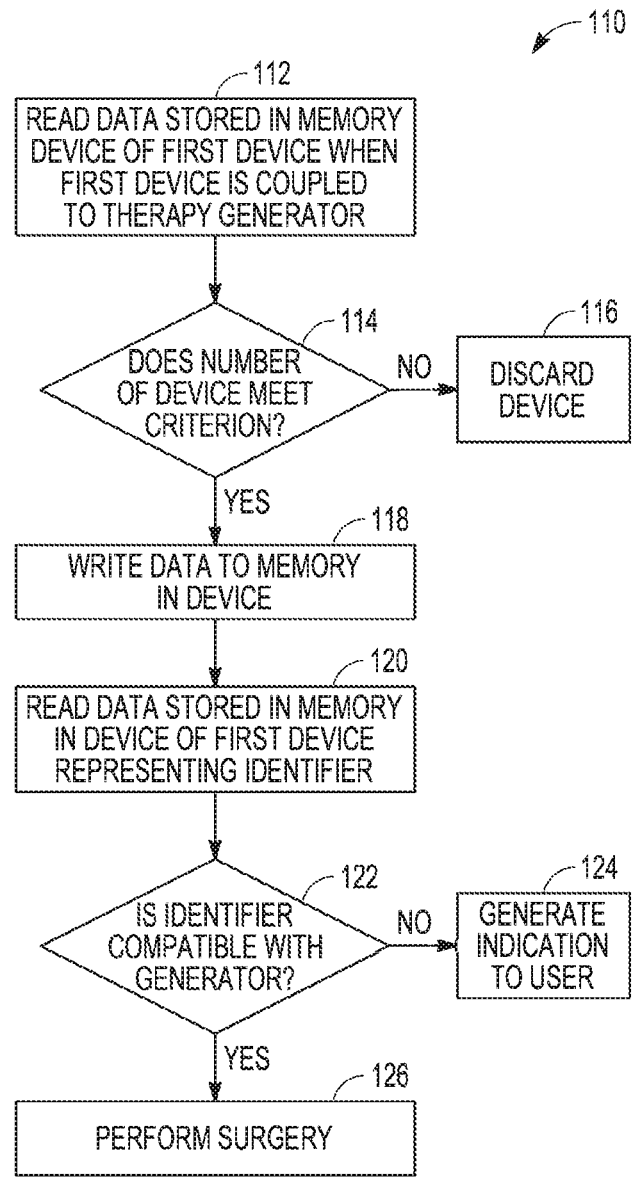
FIG. 5 is an example of another method of operating a surgical system using various techniques of this disclosure.

FIG. 5 is an example of another method 110 of operating a surgical system using various techniques of this disclosure.

At block 112, a control circuit, e.g., control circuit 72 of FIG. 3, can read data stored in a memory device of a first device, e.g., cable or surgical device, when the first device is coupled, directly or indirectly, to a terminal in electrical communication with the control circuit, where the data represents a number of second devices, e.g., surgical devices or cables, previously coupled to the first device. For example, the control circuit can query a memory device in the cable to determine how many surgical devices were previously coupled to the cable, or it can query a memory device in a surgical device and determine how many cables were connected to the surgical device.

At block 114, the control circuit can determine, based on the data read from the memory device, whether the number of second devices, e.g., surgical devices or cables, previously coupled to the first device, e.g., cables or surgical devices, meets a criterion. For example, the control circuit can compare to a threshold a retrieved list of serial numbers or a retrieved count from a memory device in the cable to determine if the number of surgical devices previously coupled to the cable exceeds the threshold. Or, the control circuit can compare to a threshold a retrieved list of serial numbers or a retrieved count from a memory device in the surgical device to determine if the number of cables previously coupled to the surgical device exceeds the threshold.

If the number does not meet the criterion ("NO" branch of block 114), then the user can be prompted to discard the device at block 116, e.g., via the indicator 67 of FIG. 3. If the number does meet the criterion ("YES" branch of block 114), then, at block 118, the control circuit can write data to the memory device of either or both of the first device and second device to increase the number of identifiers in the list or the number in the count.

At block 120, the control circuit can read data stored in a memory device of either or both of the first device, e.g., cable or surgical device, or the second device, e.g., surgical device or cable, representing an identifier, where the identifier represents a plurality of first or second devices, e.g., an electronic key of either or both of the first device and the second device. In some examples, the control circuit can read the criterion from either or both of the device memory, thereby separating the execution of the criterion to the control circuit from the criterion itself (e.g., the memory device holds the threshold value).

At block 122, the control circuit can determine whether the identifier(s) is compatible for use with a cable and/or the therapy generator of the surgical system. If the identifier(s) is not compatible ("NO" branch of block 122), then the control circuit can generate an indication to the user at block 124. If the identifier(s) is compatible ("YES" branch of block 122, then a surgical procedure can proceed at block 126.

Using various techniques above can have one or more advantages. For example, the techniques described above do not rely on time or date to track use of devices. Times and/or dates need to be properly setup on a generator and can be inaccurate or manipulated.

In addition, by using a memory device, the hospital staff does would not have to manually or electronically record anything in their tracking system. The generator can perform all of the tracking automatically using the cable, e.g., power cord, and/or the surgical device as a memory store. Also, if there was a concern about the number of counts remaining on the cable, the generator can be used to interrogate the cable and provide the user with the number of counts remaining.

Notes

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A surgical system comprising:
    a control circuit; and
    an output circuit coupled to the control circuit and configured to generate and provide a therapeutic output signal to an output terminal for delivery to a patient,
    wherein the control circuit is configured to:
    read data stored in a memory device of a first device when the first device is coupled to a terminal in electrical communication with the control circuit, wherein the data represents a number of second devices previously coupled to the first device, wherein the first device includes a cable and each of the second devices includes a surgical device configured to be in contact with and deliver a therapeutic output signal to tissue of a patient;
    determine, based on the data read from the memory device, whether the number of second devices previously coupled to the first device meets a criterion, wherein the criterion is a maximum number of second devices;
    write data representing the number of second devices previously coupled to the first device as data representing a list of serial numbers to the memory device of the first device or write data representing the number of second devices previously coupled to the first device as data representing a count of serial numbers to the memory device of the first device; and
    generate an audio and/or visual indication to a user when the number of second devices previously coupled to the first device meets or exceeds the criterion.

2. The surgical system of claim 1, wherein the control circuit is configured to:
    read data stored in the memory device representing a first identifier, wherein the first identifier represents a plurality of second devices; and
    determine whether the first identifier is compatible for use with a therapy generator of the surgical system.

3. The surgical system of claim 2, wherein the audio and/or visual indication is a first indication, and wherein the control circuit is configured to:
    generate a second indication to the user when the control circuit determines that the first identifier is not compatible with the surgical system.

4. The surgical system of claim 1, wherein the audio and/or visual indication is a first indication, and wherein the control circuit is configured to:
    generate a second indication to the user when the control circuit determines that the number of second devices previously coupled to the first device does not meet the criterion.

5. The surgical system of claim 1, wherein the memory device is a first memory device, and wherein a unique second identifier is stored in a second memory device of one of the second devices.

6. The surgical system of claim 5, wherein the control circuit is configured to:
determine whether the unique second identifier of the second device is included in the data that represents the number of second devices previously coupled to the first device.

7. The surgical system of claim 6, wherein the unique second identifier of the second device is a serial number.

8. The surgical system of claim 1, further comprising:
an electrosurgical generator.

9. The surgical system of claim 1, further comprising:
an ultrasonic generator.

10. The surgical system of claim 1, wherein the control circuit is further configured to:
write a unique second identifier of one of the second devices to the memory device of the first device when the one of the second devices is coupled to the first device and when the criterion is met.

11. The surgical system of claim 1, wherein the data that represents the number of second devices previously coupled to the first device is stored as data representing a count of serial numbers.

12. The surgical system of claim 1, wherein the control circuit is configured to write data representing the number of second devices previously coupled to the first device as data representing a list of serial numbers to the memory device of the first device.

13. The surgical system of claim 1, wherein the control circuit is configured to write data representing the number of second devices previously coupled to the first device as data representing a count of serial numbers to the memory device of the first device.

14. A method of operating a surgical system, the method comprising:
reading data stored in a memory device of a first device when the first device is coupled to a therapy generator of the surgical system, wherein the data represents a number of second devices previously coupled to the first device, wherein the first device includes a cable and each of the second devices includes a surgical device configured to be in contact with and deliver a therapeutic output signal to tissue of a patient;
determining, based on the data read from the memory device, whether the number of second devices previously coupled to the first device meets a criterion, wherein the criterion is a maximum number of second devices;
writing data representing the number of second devices previously coupled to the first device as data representing a list of serial numbers to the memory device of the first device or writing data representing the number of second devices previously coupled to the first device as data representing a count of serial numbers to the memory device of the first device; and
generating an audio and/or visual indication to a user when the number of second devices previously coupled to the first device meets or exceeds the criterion.

15. The method of claim 14, further comprising:
reading data stored in the memory device representing a first identifier, wherein the first identifier represents a plurality of second devices; and
determining whether the first identifier is compatible for use with the surgical system.

16. The method of claim 15, wherein the audio and/or visual indication is a first indication, the method further comprising:
generating a second indication to the user when the first identifier is determined to not be compatible with the surgical system.

17. The method of claim 14, wherein the audio and/or visual indication is a first indication, the method further comprising:
generating a second indication to the user when the number of second devices previously coupled to the first device does not meet the criterion.

18. The method of claim 14, wherein the memory device is a first memory device, wherein a unique second identifier is stored in a second memory device of one of the second devices, and wherein the unique second identifier of the second device coupled to the first device is a serial number of the one of the second devices.

19. The method of claim 14, wherein the data that represents the number of second devices previously coupled to the first device is stored as data representing a list of serial numbers.

20. The method of claim 14, wherein the data that represents the number of second devices previously coupled to the first device is stored as data representing a count of serial numbers.

21. The method of claim 14, wherein the memory device is a first memory device, wherein a unique second identifier is stored in a second memory device of one of the second devices, the method further comprising:
determining whether the unique second identifier of the one of the second devices is included in the data that represents a number of second devices previously coupled to the first device.

22. The method of claim 14, further comprising:
writing a unique second identifier of one of the second devices to the memory device of the first device when the criterion is met.

23. A surgical system comprising:
a surgical device configured to be in contact with and deliver a therapeutic output signal to tissue of a patient, the surgical device including a first memory device, the first memory device configured to store a unique first identifier of the surgical device;
a cable including:
a connector configured to couple to the surgical device; and
a second memory device configured to:
store data that represents a count of a plurality of different surgical devices previously coupled to the cable; and
a control circuit configured to:
generate an audio and/or visual indication to a user when the count of the plurality of different surgical devices previously coupled to the cable meets or exceeds a criterion.

24. The surgical system of claim 23, wherein the second memory device is configured to:
store data that represents a second identifier that represents a plurality of surgical devices compatible for use with a therapy generator of the surgical system.

* * * * *